United States Patent
Guinart et al.

(10) Patent No.: US 9,884,524 B2
(45) Date of Patent: Feb. 6, 2018

(54) METHOD FOR TRANSMITTING IDENTIFICATION SIGNALS FORMULATED ACCORDING TO N DIFFERENT PROTOCOLS, USING AN ELECTRONIC CASING PROVIDED ON A WHEEL OF A VEHICLE

(71) Applicants: CONTINENTAL AUTOMOTIVE FRANCE, Toulouse (FR); CONTINENTAL AUTOMOTIVE GmbH, Hannover (DE)

(72) Inventors: Nicolas Guinart, Toulouse (FR); Jean-Charles Huard, Toulouse (FR); Sebastien Kessler, Dremil-Lafage (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/104,756

(22) PCT Filed: Dec. 15, 2014

(86) PCT No.: PCT/EP2014/003358
§ 371 (c)(1),
(2) Date: Jun. 15, 2016

(87) PCT Pub. No.: WO2015/090554
PCT Pub. Date: Jun. 25, 2015

(65) Prior Publication Data
US 2016/0318355 A1    Nov. 3, 2016

(30) Foreign Application Priority Data
Dec. 20, 2013    (FR) ..................... 13 63166

(51) Int. Cl.
*G08B 21/00* (2006.01)
*B60C 23/04* (2006.01)
(Continued)

(52) U.S. Cl.
CPC ...... *B60C 23/0416* (2013.01); *B60C 23/0488* (2013.01); *B60C 23/0489* (2013.01); *B60T 8/172* (2013.01); *G01P 3/44* (2013.01)

(58) Field of Classification Search
CPC .......................... B60C 23/0416; B60C 23/00
(Continued)

(56) References Cited

U.S. PATENT DOCUMENTS

| | | |
|---|---|---|
| 5,808,190 A | 9/1998 | Ernst |
| 6,112,587 A | 9/2000 | Oldenettel |

(Continued)

FOREIGN PATENT DOCUMENTS

| | | |
|---|---|---|
| DE | 10 2010 042198 A1 | 4/2012 |
| EP | 0 806 306 A2 | 11/1997 |

(Continued)

OTHER PUBLICATIONS

International Search Report dated Mar. 13, 2015 in corresponding PCT application.

*Primary Examiner* — Jeffery Hofsass
(74) *Attorney, Agent, or Firm* — Young & Thompson

(57) ABSTRACT

A method for transmitting n identification signals (P1-P4) formulated according to n different protocols, using an electronic casing (6) provided on a wheel (2) of a vehicle, as part of an angular correlation locating procedure. An electronic casing (6) is used, which is programmed to carry out, per wheel turn, x transmissions commanded for x angular positions offset from each other by predetermined angular values and, during each sending operation, a fixed angular position of the electronic casing (6) is determined, to which position is assigned the reference angular position function for determining the x transmission angular positions of the electronic casing, and a burst of n identification signals sent consecutively for transmission successive angular positions (Continued)

Figure 1:
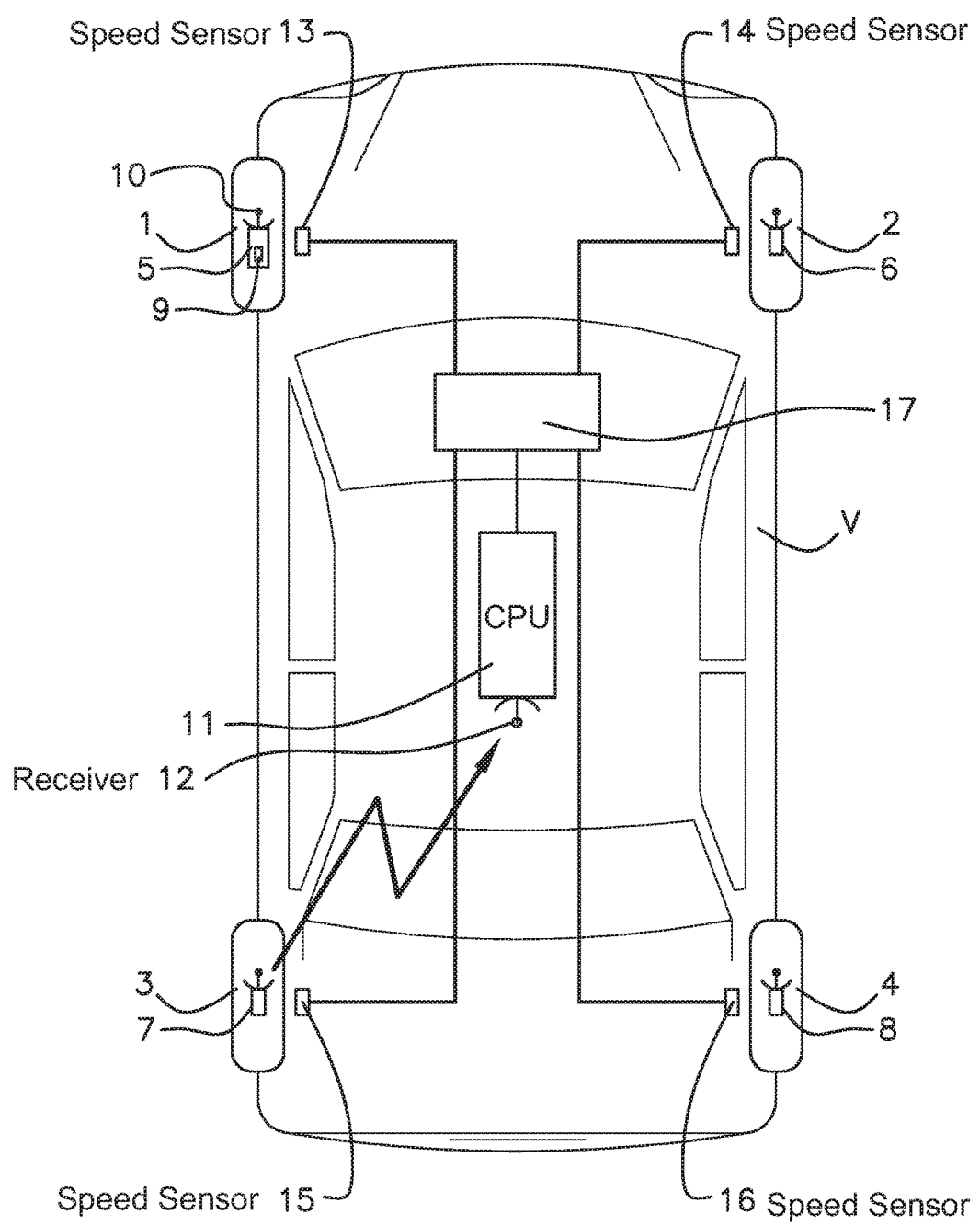

of the electronic casing (6) is transmitted, each of the signals being formulated according to one of the n protocols and including data for identifying the electronic casing and the transmission angular position thereof.

6 Claims, 3 Drawing Sheets

(51) Int. Cl.
*B60T 8/172* (2006.01)
*G01P 3/44* (2006.01)

(58) Field of Classification Search
USPC .................................. 340/442, 443, 445, 447
See application file for complete search history.

(56) References Cited

U.S. PATENT DOCUMENTS

| 7,518,495 | B2 | 4/2009 | Tang et al. |
| 2014/0019003 | A1 | 1/2014 | Guinart et al. |
| 2014/0371980 | A1* | 12/2014 | Sekizawa ............ B60C 23/0416 701/34.4 |

FOREIGN PATENT DOCUMENTS

| EP | 0 895 879 A2 | 2/1999 |
| EP | 2 450 202 A1 | 5/2012 |
| FR | 2 974 033 A1 | 10/2012 |
| FR | 2 985 014 A1 | 6/2013 |
| WO | 2013/118486 A1 | 8/2013 |

\* cited by examiner

METHOD FOR TRANSMITTING IDENTIFICATION SIGNALS FORMULATED ACCORDING TO N DIFFERENT PROTOCOLS, USING AN ELECTRONIC CASING PROVIDED ON A WHEEL OF A VEHICLE

The invention relates to a method for transmitting identification signals formulated according to n different protocols, using an electronic casing provided on a wheel of a vehicle, as part of a procedure for locating said wheel.

Many methods are currently proposed for locating the position of the wheels of a vehicle equipped with a system for monitoring operating parameters of the tires mounted on these wheels, including methods of location by angular correlation, such as particularly described in the patents EP0806306 and EP0895879, and FR2974033, the concept of which is based on the correlation existing between the signals delivered by an angular sensor provided on a wheel and the signals delivered by a speed sensor mounted on the vehicle proximate to this wheel.

Since most current vehicles are equipped with active safety systems such as an ABS system, and an ESP system, such locating methods are particularly of great interest in terms of installation cost, since the wheels are located by correlating the signals delivered by the speed sensors of said active safety system and the signals delivered by the angular sensors usually incorporated in the electronic casings of the monitoring system.

As a result, indeed the implementation of these locating methods simply necessitates the implementation of software for processing the delivered signals but does not require any addition of specific hardware.

Usually, the monitoring systems are directly installed on the new vehicles such that the central processing unit and the electronic casings are designed to communicate by means of a specific protocol.

By contrast, one development consisted in producing so-called "universal" electronic casings such as particularly described in the U.S. Pat. No. 7,518,495, which are intended to be retrofitted on the vehicles and designed, for this purpose, to transmit signals formulated according to several protocols in order to be able to communicate with the central processing units of vehicles of different makes and/or models.

The present invention is part of this development and the first aim thereof is to provide a method for transmitting, using an electronic casing, identification signals formulated according to n protocols, leading, during the implementation of an angular correlation locating procedure, to an optimum reduction in the energy consumption of the electronic casings.

Another aim of the invention is to provide a transmission method which leads to an increase in the performance of the angular correlation locating methods in terms of responsiveness and reliability.

To this end, the invention relates to a method for transmitting identification signals P1-Pn formulated according to n different protocols, using an electronic casing provided on a wheel of a vehicle, as part of a locating procedure, said transmitting method consisting, according to the invention, in firstly using electronic casings programmed to carry out, per wheel turn, x transmissions commanded for x angular positions offset from each other by predetermined angular values, and secondly, during each sending operation:

determining a fixed angular position of the electronic casing, to which position is assigned the reference angular position function for determining the x transmission angular positions of said electronic casing, and transmitting a burst of n identification signals sent consecutively for transmission successive angular positions of the electronic casing, each of said signals being formulated according to one of the n protocols and including the code for identifying the electronic casing and data for identifying the transmission angular position thereof.

It should be noted that, according to the invention, protocol means defining the rules for establishing communication between an electronic casing mounted on a wheel of a vehicle and a central processing unit located in said vehicle. A protocol, therefore, results in a format in which the messages are prepared, in particular defining the sequence and the length of each parameter, (number of bits assigned to each parameter, etc.).

Thus, each protocol is defined at least:

by a sequence of parameters that is specific thereto (for example—in a nonlimiting manner—preamble, identifying code, pressure value, temperature value, transmission angular position, checksum) according to a first protocol and in another protocol these same parameters can be transmitted in a different order, or can indeed include additional parameters or indeed fewer parameters.

by spaces available for each of the parameters thereof (numbers of bits) that are specific thereto, by a transmission frequency that is specific thereto.

All of the information sent according to a protocol forms an identification signal. This identification signal is, therefore, different (in the form thereof, the composition thereof, the length thereof, etc.) for various protocols.

According to the invention, each sending operation for the n identification signals requires a procedure for determining the reference angular position after which the n various identification signals, each formulated according to a given protocol, are delivered in the form of a burst of n consecutive signals each sent for one of the predetermined angular positions of the electronic casing.

This methodology leads to a low energy consumption of the electronic casings since it requires only a single procedure for determining the reference angular position. Indeed, such procedures, particularly described in the patents FR2974033 (relating to the electronic casings mounted on the rim of the wheels) and FR2985014 (relating to the electronic casings positioned on the tread of the tires), necessitate an increased sampling and a filtering of the measurements provided by the angular sensors incorporated into the electronic casings, which prove to lead to a large energy consumption. Therefore, the fact of only requiring one of these procedures for each sending operation leads to optimizing the energy consumption of the electronic casings, and to obtaining, for the procedure of location by correlation, an overall consumption of approximately that generated by a procedure of location by correlation performed with a conventional electronic casing transmitting signals formulated according to a single protocol.

According to another advantageous method of implementing the invention, the aim of which is to increase the quality of reception of the identification signals:

for each protocol, the transmission time for an identification signal formulated according to said protocol is determined, and, before each sending operation, the rotational speed of the wheel is determined, and in order to carry out the actual transmissions of the n identification signals, a series of transmission angular positions is selected, which positions are separated from each other by angular distances suitable such that the entirety of each of the identification signals is sent between two transmission commands.

This implementation method leads, therefore, particularly for high rotational speeds and/or for protocols leading to significant transmission times, to masking transmission angular positions, i.e. to not commanding transmission of a signal for said angular positions, such as to ensure the entire sending of the identification signals sent for the angular positions preceding these masked angular positions.

Moreover, to assess the appropriateness of possible maskings, a rotational speed threshold value of the wheel is determined advantageously according to the invention:

below which none of the transmission angular positions are masked, and therefore an identification signal is transmitted successively for each of the transmission angular positions, above which at least one of the transmission angular positions is masked, and, for this purpose, a series of transmission angular positions is selected, which series is suitable such that the entirety of each of the identification signals is sent between two transmission commands.

According to another advantageous method of implementing the invention, between two bursts, the transmission angular position of each of the identification signals formulated according to the protocols P1-Pn is modified, such that each identification signal Pi is transmitted successively for a plurality of transmission angular positions.

This implementation method leads to increasing the performance of the locating method in terms of responsiveness and reliability. Indeed, each identification signal is transmitted for a plurality of transmission angular positions offset relative to one another by given angular values. As a result, the transmission method meets the current requirements for a sufficient variety of transmission predetermined angles to ensure the proper operation of the locating function, despite, particularly, the so-called "black spot" reception fault phenomena, regardless of the nature of the vehicles provided with the monitoring system.

Figure 2:
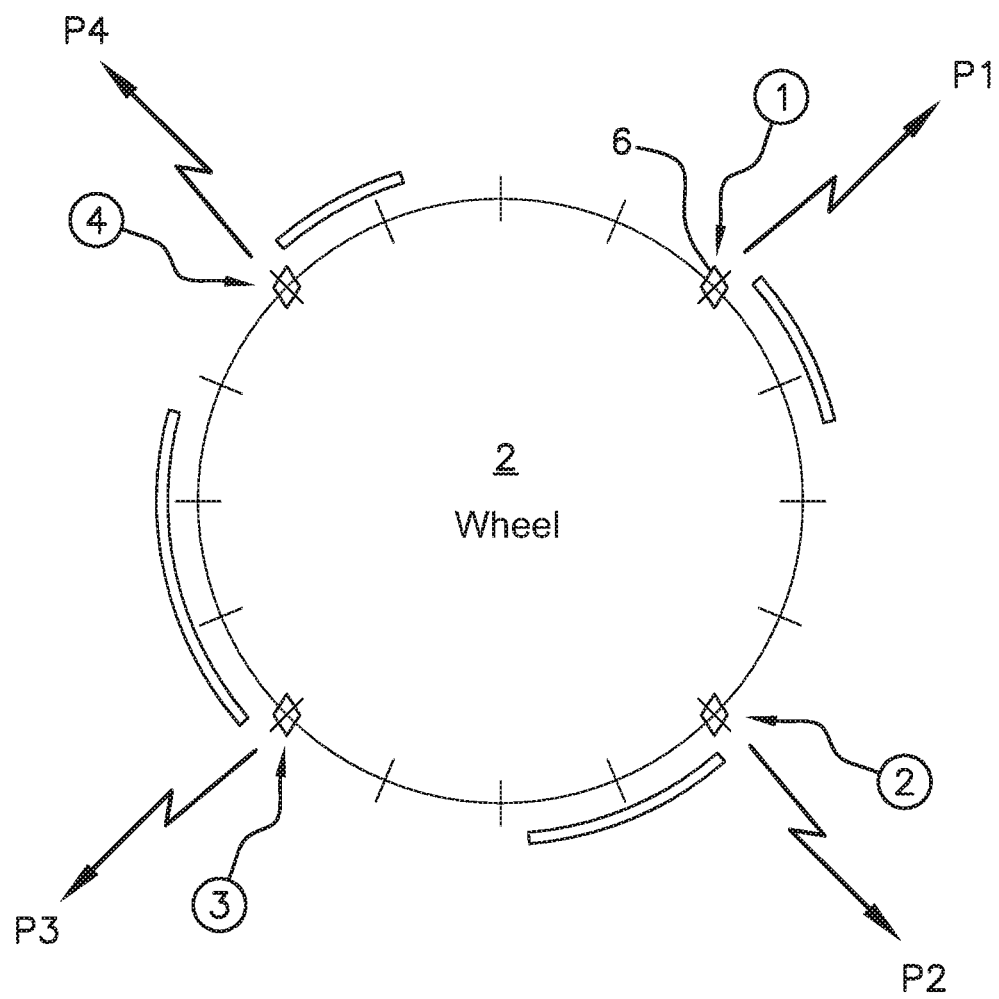
Figure 3A:
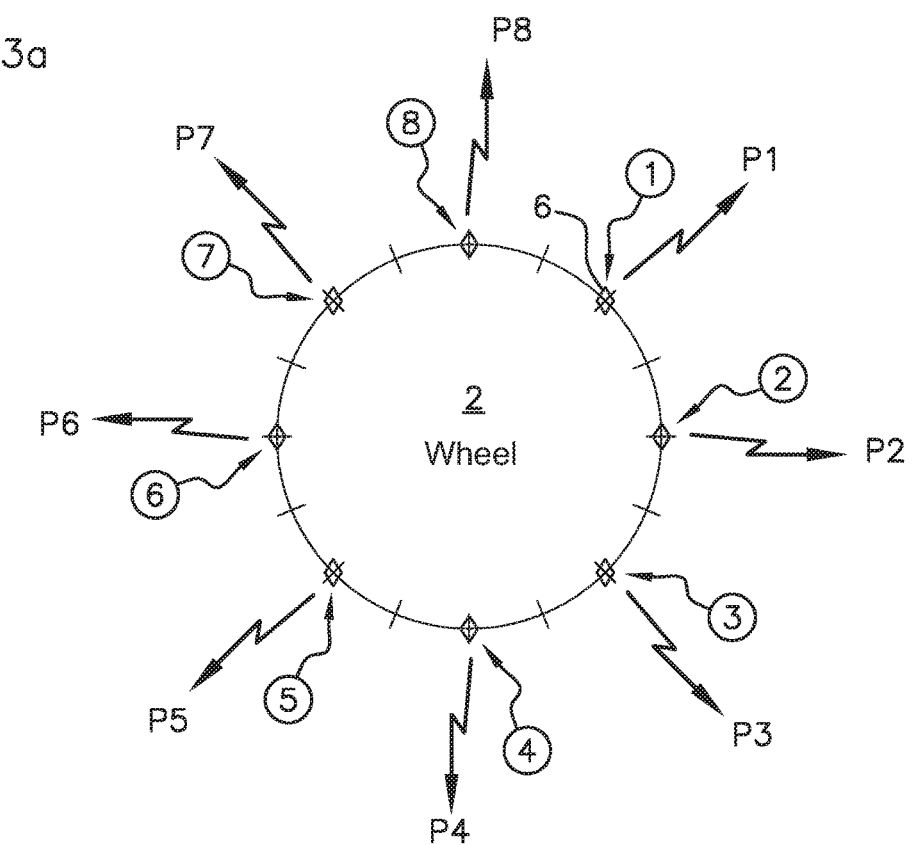
Figure 3B:
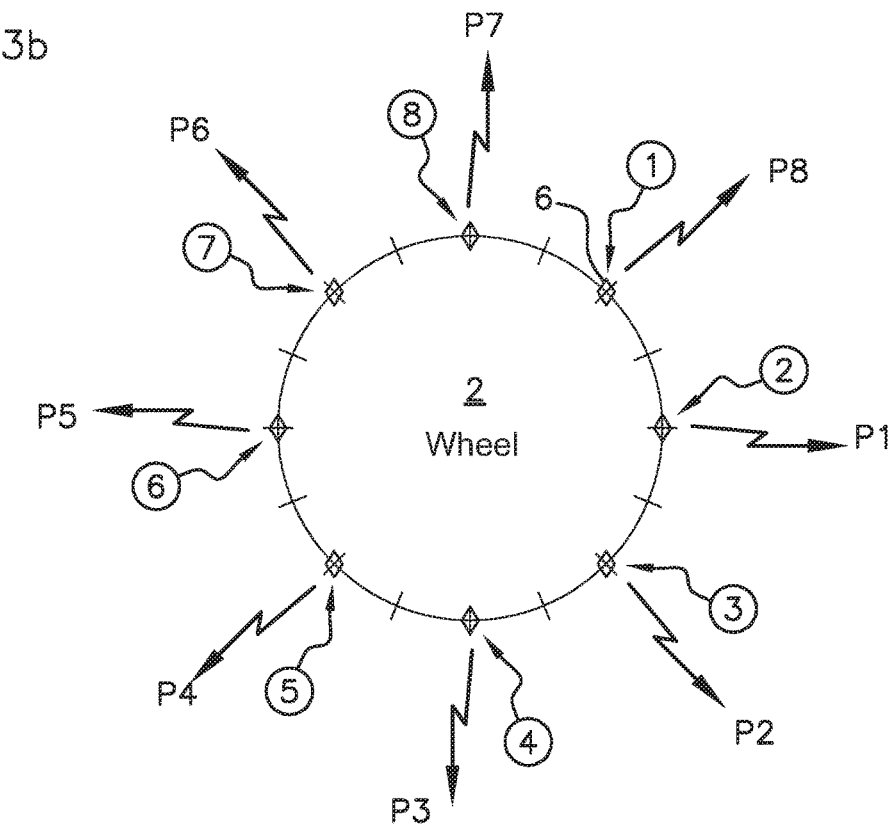

Other features, aims and advantages of the invention will emerge from the following detailed description with reference to the appended drawings which show, by way of nonlimiting example, a preferred implementation method thereof. In these drawings:

FIG. 1 is a schematic top view of a vehicle provided with a monitoring system and with an active safety system for the implementation of the method according to the invention for transmitting identification signals as part of a procedure for locating the position of the wheels of said vehicle, FIG. 2 is a diagram representing a wheel illustrating the principle of the method according to the invention during an implementation example for transmitting identification signals formulated according to four different protocols, and FIGS. 3a and 3b are diagrams representing a wheel illustrating the principle of sending two successive bursts consisting, in the example, of two bursts of eight identification signals.

The transmission method according to the invention is suitable for being implemented as part of a procedure for locating the position of wheels of a vehicle V as shown in FIG. 1, which vehicle is provided with four wheels 1-4 and equipped with a system for monitoring parameters, such as pressure and/or temperature, of the tires, and with an active safety system such as an ABS system or an ESP system.

Usually, the monitoring system conventionally includes, firstly, associated with each wheel 1-4, an electronic casing 5-8, for example rigidly connected to the rim of said wheel such as to be positioned inside the tire outer cover.

Each of these electronic casings 5-8 incorporates sensors which are dedicated to measuring the parameters of the tires, and are connected to a microprocessor computing unit connected to a transmitter 10.

Each of these electronic casings 5-8 also incorporates, conventionally, means 9 for measuring the angular position of said electronic casing. Such measuring means can advantageously consist, when the electronic casings are mounted on the rims of the wheels 1-4, of an accelerometer suitable for providing modulated signals representing the values of gravity and therefore of the angular position of the electronic casing, the frequency of which, equal to the rotational frequency of the wheels, allows, furthermore, the rotational speed of said wheels to be calculated.

In the case of electronic casings 5-8 positioned on the inner face of the tread of the tires, the measuring means 9 advantageously consist of sensors for measuring the radial acceleration of the wheel, of the micro-electromechanical system-, piezoelectric sensor-, impact sensor-type, which are also suitable, as particularly described in FR2985014, for providing data to calculate the rotational speed of the wheels.

Moreover, according to the invention, each of these electronic casings 5-8 includes means for storing n different protocols for allowing the transmission of signals formulated according to each of these protocols.

Finally, according to the invention, each of these electronic casings 5-8 is programmed to carry out, per wheel turn, x transmissions commanded for x angular positions offset from one another by predetermined angular values.

Using the most common examples, such electronic casings 5-8 can, therefore, be programmed to command, per wheel turn:

two transmissions for angular positions offset by 90° or 180°, four transmissions for angular positions offset by 90°, eight transmissions for angular positions offset by 45°.

The monitoring system also comprises a central processing unit 11 located in the vehicle V, including a microprocessor and incorporating a receiver 12 suitable for receiving the signals transmitted by the transmitters 10 of each of the four electronic casings 5-8.

The vehicle V is also equipped with an active safety system such as an ABS system, ESP system, including four wheel speed sensors 13-16 which are positioned on the vehicle V, each proximate to a wheel 1-4, and are suitable for providing, in the form of values convertible into angular values, data representing the orientation of said wheel.

Moreover, this active safety system includes an ABS or ESP computer 17 which is connected to the various wheel speed sensors 13-16, such as to receive the wheel speed information measured by said sensors, and which is programmed to anticipate the adjustments intended to prevent the wheels 1-4 from locking.

Usually, the wheel speed sensors 13-16 consist of inductive, magneto-resistive or Hall effect sensors, suitable for measuring the speed of each wheel 1-4 on a toothed or magnetic wheel.

If n is the number of stored protocols, as part of a procedure for locating a wheel 1-4, the electronic casing 5-8 provided on said wheel 1-4 is designed to periodically send n identification signals P1-Pn each formulated according to a different protocol.

The sending recurrence for these n signals is approximately several seconds, generally 15 to 20 seconds, in order, firstly, to respect the radio frequency standards, and secondly, to allow a sufficient desynchronization of the wheels 1-4.

According to the invention, firstly, a preliminary step consists in:
- calculating, for each protocol, the transmission time for an identification signal formulated according to said protocol,
- deducing from this calculation a rotational speed threshold value below which the entirety of each of the identification signals can be sent between two transmission successive angular positions without risk of overlap between the end of transmitting one identification signal and the start of sending the following identification signal. Sending "the entirety of a signal" means defining the actual time for transmitting an identification signal with addition of a time interval allowing the central processing unit 11 to detect the transmission interruption.

Subsequently, for each of the sending operations, the method according to the invention consists in:
- calculating the rotational speed of the wheel 1-4 deduced from the period of the curve representing gravity provided by the accelerometer 9,
- determining (for example by increased sampling and filtering of the measurements provided by the accelerometer 9) a fixed angular position of the electronic casing 5-8, to which position is assigned the reference angular position function for determining the x transmission angular positions of said electronic casing,
- and transmitting a burst of n identification signals sent consecutively for transmission successive angular positions of the electronic casing 5-8, each of said signals being formulated according to one of the n protocols and including, particularly, the code for identifying the electronic casing 5-8 and data for identifying the transmission angular position.

Moreover, the transmission angular positions selected for the transmission of this burst depend on the result of the comparison between the actual rotational speed and the threshold speed.

Therefore, if the rotational speed is less than or equal to the threshold speed, an identification signal is transmitted successively for each of the transmission angular positions.

By contrast, if the rotational speed is greater than the threshold speed, some transmission angular positions are masked and, to this end, a series of transmission angular positions are selected, which positions are separated from each other by angular distances suitable such that the entirety of each of the identification signals is sent between two transmission commands.

In view of this selection, a first solution can consist in establishing and storing a plurality of scenarios designed to each respond to a given situation. A second common solution can also consist in performing this selection by means of a suitable algorithm.

Furthermore, the transmission angular position for each of the identification signals P1-Pn is modified between two successive sending operations such that each identification signal Pi is transmitted successively for a plurality of transmission angular positions.

Therefore, the transmission method meets the current requirements for a sufficient variety of transmission predetermined angles to ensure the proper operation of the locating function, in spite of the existence of black spot areas.

FIG. 2 shows a wheel 2 equipped with an electronic casing 6 programmed to carry out, per wheel turn, four transmissions commanded for four angular positions (referenced 1 to 4) offset from one another by 90°, allowing, according to the example shown, the transmission of a burst of four identification signals P1-P4 each sent consecutively for one of the transmission angular positions of the electronic casing 6.

It should be noted that, in the example shown, the transmission time for each of the four identification signals allows these four identification signals to be sent without risk of overlap between the end of transmitting one identification signal and the start of sending the following identification signal.

In the opposite case resulting for example, particularly, from a higher rotational speed of the wheel 2 affecting the sending operation for the entirety of the identification signal P3 (signal with the greatest sending time in this example), the burst of the four identification signals can be carried out over two successive turns of the wheel 2.

Therefore, both identification signals P1 and P2 can be sent during a first wheel turn for angular positions offset by 90° or 180°, then both identification signals P3 and P4 can be sent during a second wheel turn for angular positions offset by 180°.

Another selection can also consist in sending the three identification signals P1 to P3 during a first wheel turn for angular positions offset by 90°, and then in sending the identification signal P4 during a second turn of the wheel 2.

FIGS. 3a and 3b show a wheel 2 equipped with an electronic casing 6 programmed to carry out, per wheel turn, eight transmissions commanded for eight angular positions (referenced 1 to 8) offset from each other by 45°, allowing, in the example shown, the transmission of a burst of eight identification signals P1-P8 each sent consecutively for one of the transmission angular positions of the electronic casing 6.

Furthermore, these two figures show the wheel 2 during the sending of two successive bursts, between which the transmission angular position of each of the identification signals P1-P8 has been offset by one place, i.e. by 45°, such that, according to this offset principle, during a series of eight sending operations, each identification signal Pi is successively transmitted for all of the transmission angular positions.

As for the previous example, each burst of eight identification signals can, furthermore, be carried out over a single wheel turn, as shown, or over two or three successive turns.

The invention claimed is:

1. A method for transmitting identification signals (P1-Pn) formulated according to n different protocols, using an electronic casing (5-8) provided on a wheel (1-4) of a vehicle (V), as part of a procedure for location by correlation between measurements provided by an angular sensor (9) incorporated in said electronic casing and measurements provided by a speed sensor (13-16) mounted on the vehicle (V) proximate to said wheel, said transmission method comprising:
   using an electronic casing (5-8) which is programmed to carry out, per wheel turn, x transmissions commanded for x angular positions offset from each other by predetermined angular values, and, during each sending operation:
- determining a fixed angular position of the electronic casing (5-8), to which position is assigned the reference angular position function for determining the x transmission angular positions of said electronic casing,
- and transmitting a burst of n identification signals sent consecutively for transmission successive angular positions of the electronic casing (5-8), each of said signals being formulated according to one of the n protocols and including the code for identifying the electronic casing (5-8) and data for identifying the transmission angular position thereof.

2. The transmission method as claimed in claim 1, further comprising:
- for each protocol, determining the transmission time for an identification signal formulated according to said protocol,
- and, before each sending operation, determining the rotational speed of the wheel (1-4), and in order to carry out the actual transmissions of the n identification signals, selecting a series of transmission angular positions, which positions are separated from each other by angular distances suitable such that the entirety of each of the identification signals is sent between two transmission commands.

3. The transmission method as claimed in claim 2, further comprising determining a rotational speed threshold value of the wheel (1-4), below which an identification signal is transmitted successively for each of the transmission angular positions, and above which a series of transmission angular positions is selected, which series is suitable such that the entirety of each of the identification signals is sent between two transmission commands.

4. The transmission method as claimed in claim 1, further comprising modifying, between two bursts, the transmission angular position of each of the identification signals (P1-Pn) such that each identification signal (Pi) is transmitted successively for a plurality of transmission angular positions.

5. The transmission method as claimed in claim 2, further comprising modifying, between two bursts, the transmission angular position of each of the identification signals (P1-Pn) such that each identification signal (Pi) is transmitted successively for a plurality of transmission angular positions.

6. The transmission method as claimed in claim 3, further comprising modifying, between two bursts, the transmission angular position of each of the identification signals (P1-Pn) such that each identification signal (Pi) is transmitted successively for a plurality of transmission angular positions.

* * * * *